United States Patent [19]

Lloyd

[11] Patent Number: 5,018,667
[45] Date of Patent: May 28, 1991

[54] PHASE CHANGE INJECTION NOZZLE
[75] Inventor: Daniel L. Lloyd, Mason, Ohio
[73] Assignee: Cold Jet, Inc., Loveland, Ohio
[21] Appl. No.: 515,763
[22] Filed: Apr. 13, 1990

Related U.S. Application Data

[63] Continuation of Ser. No. 308,169, Feb. 8, 1989, abandoned.
[51] Int. Cl.$^5$ ............................ B08B 7/00; B05B 7/14
[52] U.S. Cl. ............................... 239/132.5; 239/590.5; 51/320; 51/439; 134/7
[58] Field of Search ................. 239/132, 132.1, 132.5, 239/434.5, 499, 590, 590.3, 590.5, 14.2, 2.2, 552, 553, 553.5, 553.3, 558; 51/320, 322, 439; 134/6, 7

[56] References Cited

U.S. PATENT DOCUMENTS

| | | | |
|---|---|---|---|
| 1,028,166 | 6/1912 | Whitford | 239/132.5 |
| 2,888,980 | 6/1959 | Williams et al. | 239/590.3 |
| 3,215,351 | 11/1965 | Briggs | 239/434.5 |
| 3,908,903 | 9/1975 | Burns, Jr. | 239/14.2 |
| 4,050,632 | 9/1977 | Wyse | 239/590.5 |
| 4,101,073 | 7/1978 | Curran | 239/14.2 |
| 4,154,405 | 5/1979 | Stenstrom | 239/590.3 |
| 4,631,250 | 12/1986 | Hayashi | 134/7 |
| 4,641,786 | 2/1987 | Moore | 239/590 |
| 4,744,181 | 5/1988 | Moore et al. | 51/320 |
| 4,806,171 | 2/1989 | Whitlock et al. | 51/320 |

*Primary Examiner*—Andres Kashnikow
*Assistant Examiner*—Christopher G. Trainor
*Attorney, Agent, or Firm*—Frost & Jacobs

[57] ABSTRACT

A high efficiency phase change nozzle has a body with primary orifices, a pilot nozzle extends upstream from the body and has a pilot orifice and central cavity through which a pilot flow of liquid is flashed to the solid state, cooling the pilot nozzle, thereby precooling the liquid before it flows through the primary orifices. An exit nozzle, in conjunction with a housing, assists in continuing the phase change of the mixture exiting the primary orifices and with dispersing the mixture into the downstream cavity.

30 Claims, 3 Drawing Sheets

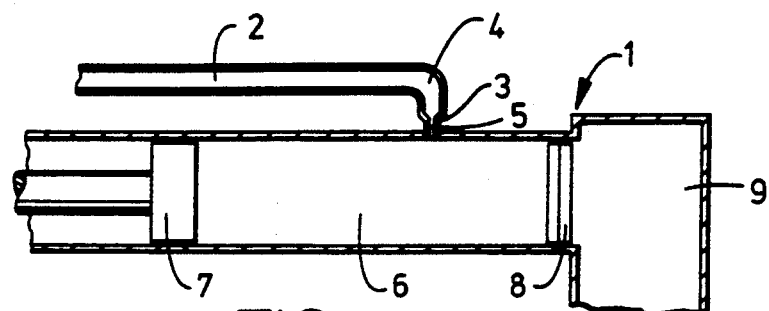
FIG. 1
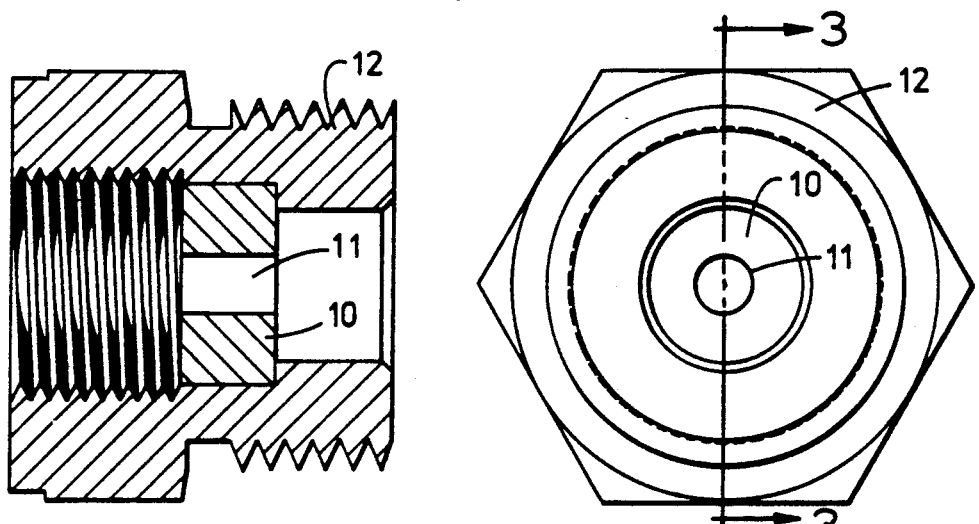
FIG. 3
PRIOR ART
FIG. 2
PRIOR ART
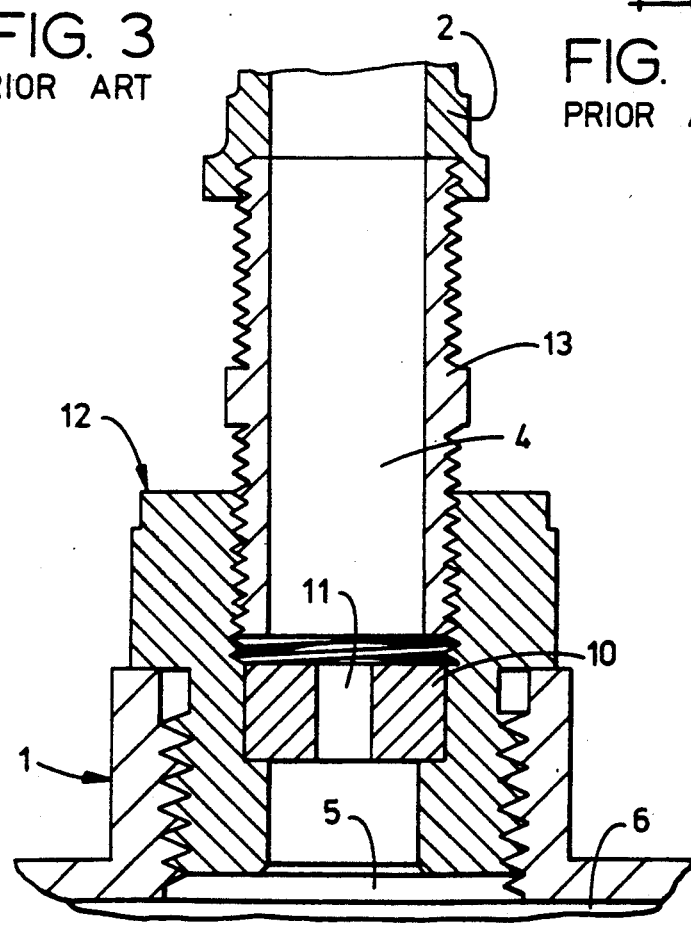
FIG. 4
PRIOR ART

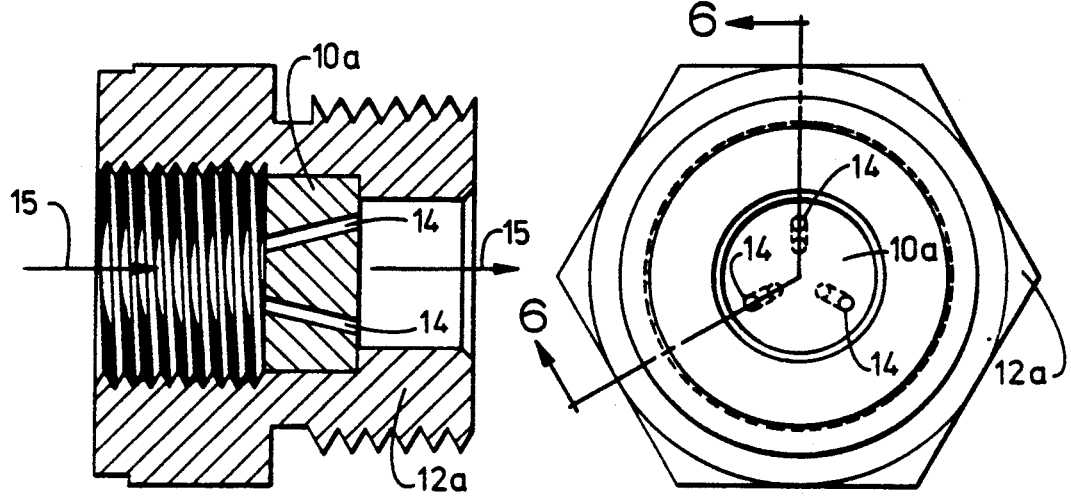
FIG. 6
PRIOR ART
FIG. 5
PRIOR ART
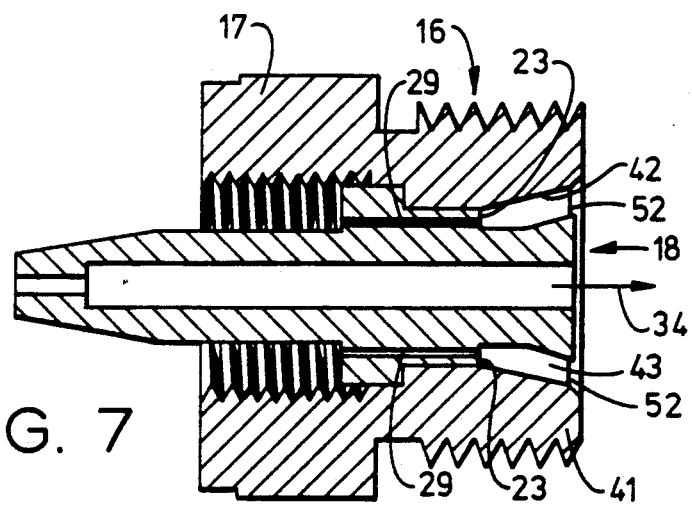
FIG. 7
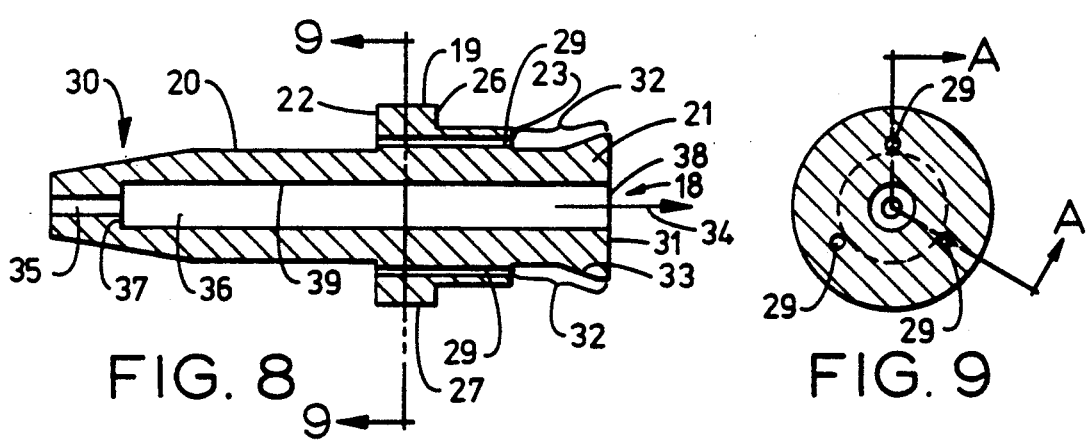
FIG. 8
FIG. 9

PHASE CHANGE INJECTION NOZZLE

This is a continuation of U.S. application Ser. No. 07/308,169, filed Feb. 8, 1989, now abandoned.

TECHNICAL FIELD

The present invention relates generally to injection nozzles, and is particularly directed to injection nozzles which cause the phase change of carbon dioxide from the liquid state to the solid state by flowing pressurized liquid $CO_2$ through an orifice. The invention will be specifically disclosed in connection with an injection nozzle which precools a flow of liquid $CO_2$ prior to the flow passing through a plurality of orifices by directing a portion of the flow through a pilot orifice.

BACKGROUND OF THE INVENTION

Injection nozzles have long been used to convert a continuous flow of a liquid under pressure into a continuous flow of solid particles. Frequently, carbon dioxide ($CO_2$) is the medium which is transformed from liquid into solid particles through the use of such injection nozzles. This is particularly true when there is a need for a continuous flow of solid $CO_2$ particles, such as is needed by particle blast apparatuses which utilize $CO_2$.

Such apparatuses are well known in the art. U.S. Pat. No. 4,744,181 discloses an apparatus used for cryogenic cleaning in which a continuous flow of $CO_2$ pellets are directed against an object to be cleaned. Such an apparatus requires a continuous supply of $CO_2$ pellets in order to allow the operator to use the apparatus for continuous cleaning. While the $CO_2$ particles may actually be crushed dry ice (solid $CO_2$) created by the apparatus by crushing large blocks of dry ice, the cleaning effect of the apparatus is more efficient if a uniform supply of solid $CO_2$ particles having a size and density within a controlled range is used. Crushing of dry ice results in unpredictable particle sizes and densities, thereby decreasing the efficiency of a cryogenic cleaning apparatus.

One method for supplying a flow of solid $CO_2$ particles within the parameters necessary for the cryogenic cleaning apparatus is to convert liquid $CO_2$ to the solid state and then to feed the particles directly into the apparatus. For maximum efficiency and economics, this requires that the actual phase change occur in close physical proximity to the cleaning apparatus. To accomplish this, a supply of pressurized liquid $CO_2$ is caused to flow through an injection nozzle where it is converted to solid $CO_2$ particles or $CO_2$ snow. The solid $CO_2$ is then forced through a die and formed into pellets by a breaker plate associated with the die. The pellets can then be transferred into the cryogenic particle blast cleaning apparatus in a continuous fashion.

Prior art injection nozzles have typically comprised a nozzle body having a single large orifice through which the entire flow of $CO_2$ passes. The pressure of the $CO_2$ drops as it flows through the orifice, causing the liquid $CO_2$ to flash to the solid state. During this process, the temperature of the $CO_2$ drops to approximately $-90°$ to $-100°$ F. Such a single orifice nozzle is known to have a low efficiency and results in a large amount of $CO_2$ remaining in the liquid state after passing through the orifice. At the lower pressure on the downstream side of the injection nozzle, this excess liquid can result in converting some of the solid $CO_2$ back to liquid or to gas. At the lower pressure, such $CO_2$ liquid quickly boils off into gas. Any $CO_2$ in the liquid or solid state after passing through the injection nozzle is wasted.

Also known in the prior art, is a nozzle referred to as the Brody Horn which is also used for converting liquid $CO_2$. The Brody Horn has three small orifices formed in the nozzle body. These orifices are angled outward from the center of the nozzle, at an angle to the direction of the flow, which helps to disperse the $CO_2$ solid particles downstream of the nozzle. The Brody Horn has a higher efficiency than a single large orificed nozzle. Still, the efficiency of the Brody Horn only ranges as high as 40%, which is an industry standard.

A problem with prior art nozzles is a condition known as "snowing the nozzle" which occurs when the orifice or orifices become blocked by solid $CO_2$. This can occur in the orifices during operation or, especially, when the flow of pressurized $CO_2$ liquid is shut off. As the pressure drops after shut off, the liquid $CO_2$ can flash to the solid state upstream of the nozzle, thereby blocking the nozzle and preventing immediate subsequent use.

There is the need in the industry for an injection nozzle which has a higher efficiency than 40%. When used with cryogenic cleaning apparatuses, or any other similar device which requires a large flow of $CO_2$ solid particles, the inefficiencies of the prior art injection nozzles very quickly results in high operational cost. The costs of using such nozzles over a long period of time with a high flow of $CO_2$ can be significant. Additional orifices located in the nozzle body, or changes in the aspect ratio of the orifice length to orifice diameter do not result in any appreciable increase in the efficiency of the injection nozzle. The present invention addresses these needs by improving the efficiency of the injection nozzle.

There is also a tremendous need for injection nozzles which do not become blocked during operation or shut down. Nozzles are needed which can reliably restart every time. The present invention also addresses these needs.

SUMMARY OF THE INVENTION

Accordingly, it is the primary object of the present invention to provide an injection nozzle for use with liquid $CO_2$ or other similar liquids for transforming a flow of the liquid into a flow of solid particles with a higher efficiency than the prior art nozzles.

It is another object of the present invention to provide an injection nozzle which transforms a flow of liquid into very fine solid particles of snow.

It is yet another object of the present invention to provide an injection nozzle which does not become clogged by solid particles during operation, or when the flow of pressurized liquid is shut off, and can be restarted reliably.

Yet another object of the present invention is to provide an injection nozzle which precools the liquid prior to it flowing through the primary orifices.

A still further object of the present invention is to provide an injection nozzle which, itself, is cooled by the phase change and resultant flow of solid particles of a pilot flow of liquid.

Additional objects, advantages, and other novel features of the invention will be set forth in part in the description that follows, and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved injection nozzle is provided for transforming a continuous flow of liquid from the liquid state to the solid state. The nozzle includes a body with an inlet surface and an outlet surface, at least one primary orifice formed through the body, and precooling means connected to the body for cooling the liquid prior to when the liquid flows through the primary orifices.

In accordance to a further aspect of the invention, the precooling means is a pilot nozzle connected to the body and extending upstream therefrom.

According to a further aspect of the present invention, the pilot nozzle has a pilot orifice formed in it which communicates with a central cavity formed through the pilot nozzle and the body, creating a continuous flow path between the upstream cavity and the downstream cavity through the pilot orifice and the central cavity.

In still a further aspect of the invention, an exit nozzle is connected to the body and extends downstream therefrom, and terminates in an exit surface. The central cavity is formed continuously through the exit nozzle, remaining in communication with the downstream cavity at the exit surface.

According to still a further aspect of the invention, the central cavity is tapered and has a cross sectional area which increases in the downstream direction.

In yet another aspect of the invention, means are provided for causing the liquid to mix while flowing past the pilot nozzle which increase the transfer of heat from the liquid to the pilot nozzle, cooling the liquid.

In still another aspect of the invention, a spring is disposed about the pilot nozzle and connected to the body.

In still a further aspect of the invention, the primary orifices have aspect ratios of at least 4.0.

In still another aspect of the invention, the pilot orifice has an aspect ratio of at least 4.0.

In accordance with another aspect of the invention, the exit nozzle has an exterior surface which at least a portion of which is an inclined surface of increasing circumference in the downstream direction.

According to another aspect of the present invention, the nozzle is disposed in a housing which extends downstream of the body, and forms an exit cavity between the housing, the outlet surface of the body, and the exterior surface of the nozzle. The final portion of the exit cavity has a decreasing cross sectional area in the downstream direction.

According to a further aspect of the invention, a nozzle body has at least one primary orifice and an exit nozzle connected to the body and extending downstream thereof. At least a portion of the exterior surface of the exit nozzle is an inclined surface of increasing circumference in the downstream direction.

Still other objects of the present invention will become apparent to those skilled in this art from the following description wherein there is shown and described in a preferred embodiment of this invention, simply by way of illustration, of one of the best modes contemplated for carrying out the invention. As will be realized, the invention is capable of other different embodiments, and that several details are capable of modification and various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1 is a simplified side elevational view of an apparatus for forming $CO_2$ pellets from snow created by a phase change nozzle.

FIG. 2 is an end view of a single orifice prior art nozzle mounted in a housing.

FIG. 3 is a cross sectional view along line 3—3 of FIG. 2 showing the single orifice prior art nozzle.

FIG. 4 is a fragmentary cross sectional side view of the nozzle of FIGS. 2 and 3, shown in an installed position.

FIG. 5 is an end view of a Brody Horn.

FIG. 6 is a cross sectional view taken along line 6—6 of FIG. 5 showing the Brody Horn.

FIG. 7 is a cross sectional view of a preferred embodiment of the present invention showing the nozzle disposed in a housing.

FIG. 8 is a cross sectional view of the body of the nozzle, pilot nozzle, and exit nozzle taken along A—A of FIG. 9.

FIG. 9 is a cross sectional view of the body of the nozzle taken along 9—9 of FIG. 8.

Figure 10:
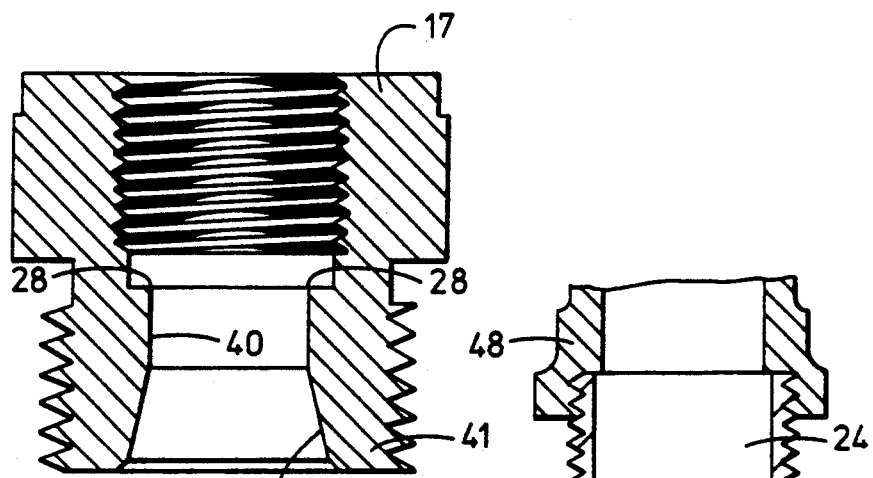
FIG. 10 is a cross sectional view of the housing of FIG. 7.

Reference will now be made in detail to the present preferred embodiment of the invention, an example of which is illustrated in the accompanying drawings.

DETAILED DESCRIPTION OF THE PREFERRED EMBODIMENT

Referring now to the drawings, FIG. 1 shows an apparatus 1 for forming $CO_2$ snow into pellets for use with a cryogenic cleaning apparatus (not shown). Apparatus 1 may, however, be incorporated as an integral part of such a cryogenic cleaning apparatus. Pressurized liquid $CO_2$ flows through hose or pipe 2 from a source of liquid $CO_2$ (not shown) to phase change nozzle 3. As the $CO_2$ liquid under pressure flows through the orifice of nozzle 3 from the upstream cavity 4 to the lower pressure downstream cavity 5, it flashes to the solid state due to its physical properties, a process which is well known in the art. The solid $CO_2$ particles, which may be formed of fine particles referred to as snow, flows from downstream cavity 5 into cylinder 6 where is accumulates due to the continuous flow of $CO_2$. At predetermined intervals, piston assembly 7 moves to the right and compresses the $CO_2$ snow, forcing it into die breaker plate assembly 8. As piston assembly 7 forces the snow through die breaker plate assembly 8, pellets of $CO_2$ are formed and forced into chamber 9, and flowing therefrom to the cryogenic cleaning apparatus (not shown).

Referring to FIGS. 2, 3, and 4, typical prior art nozzles use a body 10 having a single orifice 11 formed therethrough. The body is disposed in a housing 12 which is then installed in a high pressure $CO_2$ liquid line, such as in an apparatus 1a as shown in FIG. 4. The supply of $CO_2$ is through hose 2 which is shown in FIG. 4 as being attached by the use of an intermediate fitting 13 which is threaded into engagement with housing 12 and hose 2.

As described above, liquid $CO_2$ flows from hose 2 into upstream cavity 4, flows through orifice 11 where it flashes to the solid state and flows into downstream cavity 5, flowing therefrom into cylinder 6.

FIGS. 5 and 6 show a Brody Horn, having a body 10a with three orifices 14 which are angled relative to the direction of flow indicated by lines 15. The angle of orifices 14 assists in dispersing the $CO_2$ snow downstream of the body 10.

Figure 11:
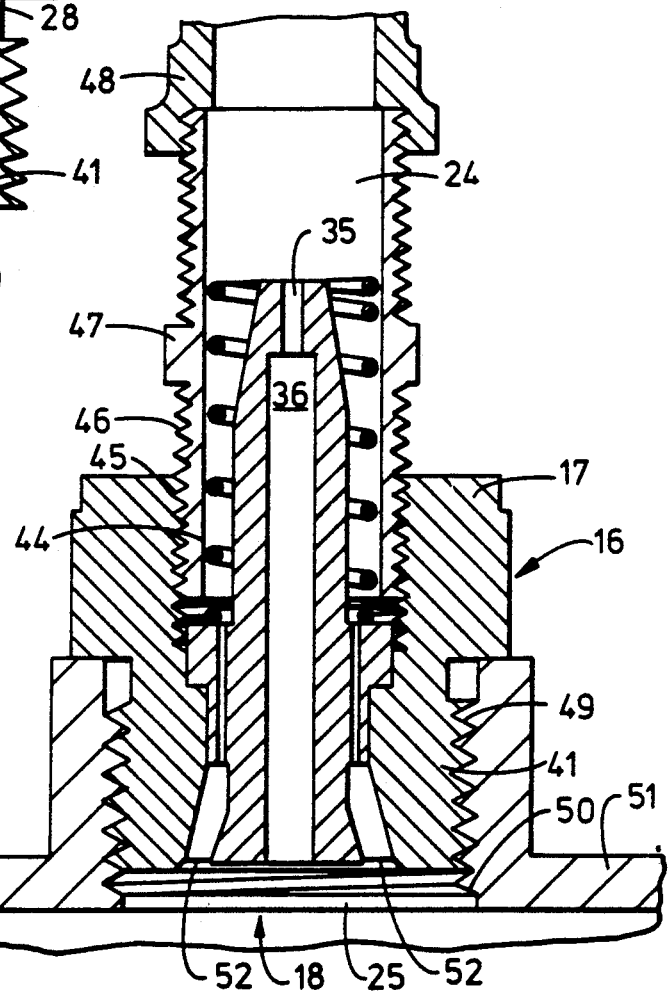
FIG. 11 is a fragmentary cross sectional view of the nozzle of FIG. 7 shown in an in use location.

FIG. 7 shows a preferred embodiment of the present invention. Nozzle 16 is comprised of two parts, housing 17 and nozzle 18. Nozzle 18 is formed as body 19, pilot nozzle 20 and exit nozzle 21. Body 19 has an inlet surface 22 which is on the upstream side of body 19 and immediately adjacent the upstream cavity 24 (FIG. 11). Body 19 also has outlet surface 23 located on the downstream side of body 19. A step 26 is formed in the outside surface 27 of body 19 for installation and assembly purposes. Housing 17, as shown in FIGS. 7 and 10 has a complimentary step 28 to allow nozzle 18 to be securely disposed within and carried by housing 17.

Three primary orifices 29 are formed through body 19 which communicate with inlet surface 22 and outlet surface 23, respectively.

Pilot nozzle 20 is connected to body 19 and extends upstream therefrom. Pilot nozzle 20 is generally cylindrical in shape and extends from the approximate center of body 19, approximately equal distance from each of the primary orifices 29. Tip 30 of pilot nozzle 20 is tapered, having an increasing circumference in the direction of flow of the liquid $CO_2$, so as to the creation of turbulence in the flow of $CO_2$.

Exit nozzle 21 extends in a downstream direction from body 19 adjacent outlet surface 23. Exit surface 31 is formed at the end of exit nozzle 21, and is substantially perpendicular to the direction of flow of the $CO_2$. It should be noted that exit surface 31 is also substantially perpendicular to the longitudinal axis of primary orifices 29. Exit nozzle 21 has an exterior surface 32 which is continuous with outlet surface 23 and terminates at exit surface 31. A portion 33 of exterior surface 32 is inclined having an increasing circumference in the downstream direction indicated by line 34. The inclined wall portion 33 terminates at exit surface 31.

A pilot orifice 35 is formed in pilot nozzle 20, which communicates with upstream cavity 24. Formed in pilot nozzle 20, body 19, and exit nozzle 21 is central cavity 36, which communicates at one end 37 with pilot orifice 35, and, at the other end 38, downstream cavity 25. Central cavity 36 has a circular cross section, with wall 39 tapered in the downstream direction 34. Thus, the cross sectional area, and circumference of central cavity 36 is larger at end 38 than at end 37.

When nozzle 18 is disposed in housing 17, it is securely held in position by an interference fit between the outside surface 27 and the inside surface 40 of housing 17. As shown in FIG. 7, housing 17 has a lower portion 41 which extends downstream of outlet surface 23. The inner surface 42 has a circular cross section which increases in area in the downstream direction 34. When nozzle 18 is assembled into housing 17, exit cavity 43 is formed annularly by inner surface 42 of housing 17, outlet surface 23 of body 19, exterior surface 32 of exit nozzle 21. Exit cavity 43 has a decreasing cross sectional area adjacent the inclined wall portion 33 in the downstream direction 34. Primary orifices 29 communicate with downstream cavity 25 through exit cavity 43.

Figure 12:
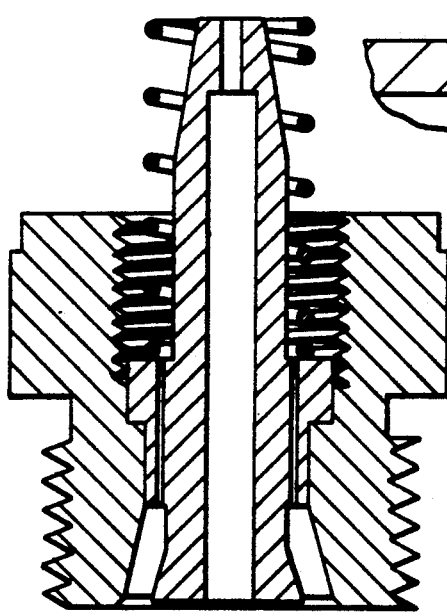
FIG. 12 is a cross sectional view of the nozzle of FIG. 7, including a turbulator.

FIGS. 11 and 12 also show a helical spring 44 connected to body 19 and disposed around pilot nozzle 20.

FIG. 11 shows nozzle 16 in an in use position. Housing 17 has internal threads 45 which mesh with the external threads 46 of intermediate fitting 47. Fitting 47 is connected to hose pipe 48 which supplies a continuous flow of liquid $CO_2$. Lower portion 41 of housing 17 has external threads 49 which intermesh with internal threads 50 of mating 30 apparatus 51. In use, liquid $CO_2$ flows from the source, through upstream cavity 24 and into nozzle 18, where the phase change occurs. Solid $CO_2$ particles, as snow, exit nozzle 18, flow through exit cavity 43 and into downstream cavity 25. As will be described below, a portion of the flow of liquid $CO_2$ flows through the pilot orifice 35 where the phase change also occurs. Solid $CO_2$ flows from pilot orifice 35 through central cavity 36 directly into downstream cavity 25.

In use, a continuous flow of liquid $CO_2$ is supplied to the upstream cavity 24 at a pressure of approximately 300 psig and a temperature of 0° F. As the flow first encounters the tip 30 of pilot nozzle 20, a portion of the flow enters pilot orifice 35. The remainder (and majority) of the flow continues past the tapered portion of tip 30, along the outside of pilot nozzle 20 and eventually through primary orifices 29.

The portion of the flow which goes through pilot orifice 35 is flashed from the liquid state to the solid state prior to exiting orifice 35. The temperature of the pilot flow of the $CO_2$ drops to about $-90°$ to $-100°$ F. when it flashes and thereafter exits pilot orifice 35 as solid particles and continues to flow through central cavity 36. The temperature drop of the $CO_2$ which occurs in pilot orifice 35, as well as the low temperature of the solid particles flowing through central cavity 36 causes pilot nozzle 20 to be cooled substantially below the temperature of the liquid $CO_2$ flowing along the outside of pilot nozzle 20. The continuous flow of $CO_2$ through the pilot orifice 35 and central cavity 36 acts as a constant temperature heat sink, because the solid particles flowing through central cavity 36 absorb heat so they sublimate to the gas state at a constant temperature due to the lower pressure of the downstream side of pilot orifice 35. This continuous flow/constant temperature sublimation acts as a heat sink to lower the temperature of pilot nozzle 20, as well as all other portions of nozzle 18, including body 19 and exit nozzle 21, which are in contact with the central cavity 36.

Pilot nozzle 20, cooled by the pilot flow flowing therethrough, has a lower temperature than the temperature of the liquid $CO_2$ flowing past the outside of pilot nozzle 20. The lower temperature of pilot nozzle 20 results in heat being transferred from the higher temperature liquid $CO_2$ flowing along pilot nozzle 20. This causes a drop in the temperature of the liquid $CO_2$ in the area of the upstream cavity 24 which is downstream of the tip 30 of pilot nozzle 20. Thus, the liquid $CO_2$ which does not flow through pilot orifice 35 is precooled prior to entering primary orifices 29 located to body 19.

To further enhance the transfer of heat from the liquid $CO_2$ to the pilot nozzle, thereby lowering the liquids temperature, spring 44 is located about the outside of pilot nozzle 20 to cause the liquid $CO_2$ to mix within itself. A device such as the spring is commonly called a turbulator, and results in more an even temperature distribution throughout the liquid $CO_2$ in this region. Thus, heat is transferred by conduction and by the mixing of the liquid $CO_2$ prior to flowing through the primary orifices 29.

The cooled liquid $C_2$ passes through primary orifices 29, a large portion of which flashes to the solid state due to the pressure drop encountered in primary orifices 29. The flow exits primary orifices 29 as a mixture of all three states of $CO_2$. The precooling of the liquid $CO_2$ prior to entering primary orifices 29 and the associated pressure drop, results in a higher percentage of $CO_2$ in the solid state being present in the flow as it exits primary orifices 29.

Due to the decreasing cross sectional area of exit cavity 43, and the shape of inclined walls 33, a dynamic head pressure results, causing some of the $CO_2$ liquid contained in the mixture at this point in the nozzle 16 to flash to solid as it leaves the exit cavity 43 through opening 52, flowing into downstream cavity 25 at a pressure of about 14.7 psia. The inclined shape of walls 33 assist in dispersing the flow in a more uniform manner, atomizing any remaining liquid. Any liquid passing through opening 53, quickly boils off into gas.

It should be noted, that the cooling effect created by the pilot flow through pilot orifice 35 also reduces the temperature of body 19, and primary orifices. The efficiency of primary orifices 29 in producing solid $CO_2$ from liquid $CO_2$ is increased due to the lower temperature of primary orifices 29, which absorbs heat from the $CO_2$ as it flows through.

It is desirable that the liquid $CO_2$, as it flows through an orifice, whether it is the pilot orifice 35 or primary orifices 29, changes to the solid state at approximately one half the length of the orifice. The location of the change of state in the orifice is a function of the pressure drop through the orifice. If the pressure drop is too great, the phase change will snow the nozzle or orifice, causing it to become clogged and operate inefficiently.

The pressure drop in a particular orifice is a function of the inlet pressure, the outlet pressure, the orifice diameter, and the orifice length. The ratio of the length of an orifice to the diameter of the orifice is called the aspect ratio. The present embodiment of this invention utilizes an aspect ratio of approximately 7.7, based on the parameters described above. The minimum aspect ratio to prevent clogging the orifice based on the above parameters has been found imperatively to be 4.0.

There is a critical stage in the operation of such nozzles. When the flow of pressurized liquid $CO_2$ is shut off, the pressure upstream of the nozzle will begin to drop. If the pressure drops too rapidly, the upstream side of the nozzle will become clogged with solid $CO_2$, essentially preventing use of the system until the solid $CO_2$ has changed to the gas state. This can take a long time.

In selecting the actual diameter of the orifice, as well as the length, it is important that the upstream pressure does not drop rapidly enough to snow the upstream side. Enough back pressure must be created on the upstream side so that the liquid remaining in the upstream cavity, and supply hoses thereto, will boil off as gas and pass through the nozzle. In the present embodiment of this invention, a primary orifice diameter of 0.052 inches and length of 0.400 inches is shown. The pilot orifice has a diameter of 0.040 inches and a length of 0.250 inches.

Also important to the practice of this invention, in the preferred embodiment, it is necessary to maintain a continuous pilot flow through the pilot orifice 35 and central cavity 36. For this reason, the walls 39 of central cavity 26 are tapered to prevent the pilot flow of solid particles from blocking the central cavity 36, thereby diminishing or eliminating the pilot flow. Through this construction, "snowing" of the pilot orifice 35 and central cavity 36 is prevented. The preferred embodiment described herein has a central cavity diameter of 0.450 inches at end 37, and a taper of 0.250 inches per foot of length of central cavity 36.

In summary, numerous benefits have been described which result from employing the concepts of the invention. The precooling of the liquid by creating a pilot flow and phase change thereof, results in improved efficiencies, as high as 48% and higher during the operation of the nozzle as described above.

The foregoing description of a preferred embodiment of the invention has been presented for purposes of illustration and description. It is not intended to be exhaustive or to limit the invention to the precise formed disclosed. Obvious modifications or variations are possible in light of the above teachings. The embodiment was chosen as described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed:

1. A nozzle for converting liquid flowing from an upstream cavity into solid particles which flow into a downstream cavity, comprising:
   (a) a body having an inlet surface and an outlet surface;
   (b) at least one primary orifice formed through said body, each of said primary orifices communicating with said inlet surface, and communicating with said outlet surface, each respective primary orifice being adapted to effect the phase change of the liquid flowing into said respective primary orifice from the liquid phase to the solid phase, said phase change cooling said body; and
   (c) precooling means connected to said body for cooling the liquid prior to the liquid flowing into said primary orifices.

2. A nozzle as claimed in claim 1 wherein said precooling means comprises a pilot nozzle connected to said body and extending upstream therefrom.

3. A nozzle as claimed in claim 2 wherein said precooling means further comprises:
   (a) a continuous central cavity formed in said pilot nozzle and through said body, said central cavity communicating with the downstream cavity; and
   (b) a pilot orifice formed in said pilot nozzle, said pilot orifice communicating with the upstream cavity and with said central cavity,
   whereby a continuous flow path is formed between the upstream cavity and the downstream cavity through said pilot orifice and said central cavity.

4. A nozzle as claimed in claim 3 wherein said central cavity is adapted to prevent solid particles from blocking said central cavity.

5. A nozzle as claimed in claim 4 wherein said central cavity is tapered, such that it has a cross sectional area which increases in the downstream direction.

6. A nozzle as claimed in claim 3 further comprising:
   (a) an exit nozzle connected to said body and extending therefrom in the downstream direction, said exit nozzle terminating in an exit surface; and
   (b) said central cavity formed continuously through said exit nozzle and communicating with the downstream cavity at said exit surface.

7. A nozzle as claimed in claim 6 wherein said central cavity is tapered such that it has a cross sectional area which increases in the downstream direction.

8. A nozzle as claimed in claim 6 further comprising mixing means for causing the liquid to mix while flowing adjacent said pilot nozzle, thereby increasing the transfer of heat from the liquid to said pilot nozzle.

9. A nozzle as claimed in claim 8 wherein said mixing means comprises a spring disposed about said pilot nozzle, said spring being connected to said body.

10. A nozzle as claimed in claim 1 wherein said primary orifices have aspect ratios of at least 4.0.

11. A nozzle as claimed in claim 3 wherein said pilot orifice has an aspect ratio of at least 4.0.

12. A nozzle as claimed in claim 6 wherein:
   (a) said exit nozzle has an exterior surface which is continuous with said outlet surface of said body, said exterior surface terminating at said exit surface; and
   (b) at least a portion of said exterior surface being an inclined surface of increasing circumference in the downstream direction.

13. A nozzle as claimed in claim 12 further comprising:
   (a) a housing in which said nozzle is disposed, said housing having a lower portion extending downstream of said body; and
   (b) an exit cavity formed by said housing, said outlet surface of said body, and said exterior surface of said exit nozzle, said exit cavity terminating at said exit surface in an exit opening, a portion of said exit cavity adjacent said exit opening having a decreasing cross sectional area in the downstream direction.

14. A nozzle for converting liquid flowing from an upstream cavity into solid particles which flow into a downstream cavity, comprising:
   (a) a body having an inlet surface and an outlet surface;
   (b) at least one primary orifice formed through said body, each of said primary orifices communicating with said inlet surface, and communicating with said outlet surface, each respective primary orifice being adapted to effect the phase change of the liquid flowing into said respective primary orifice from the liquid phase to the solid phase, said phase change cooling said body;
   (c) an exit nozzle connected to said body and extending from said outlet surface in the downstream direction, said exit nozzle terminating in an exit surface, said exit nozzle having an exterior surface which is continuous with said outlet surface of said body, said exterior surface terminating at said exit surface; and
   (d) at least a portion of said exterior surface being an inclined surface of increasing circumference in the downstream direction.

15. A nozzle as claimed in claim 14 further comprising:
   (a) a housing in which said body is disposed, said housing having a lower portion which extends downstream of said body; and
   (b) an exit cavity formed by said housing, said outlet surface of said body, and said exterior surface of said exit nozzle, said exit cavity terminating at said exit surface in an exit opening.

16. A nozzle as claimed in claim 14 further comprising:
   (a) a pilot orifice formed in said body communicating with the upstream cavity; and
   (b) a continuous central cavity formed in said exit nozzle, said central cavity communicating with said pilot orifice and the downstream cavity.

17. A nozzle as claimed in claim 14 wherein said exit nozzle includes a passageway formed therethrough, said passageway communicating with the upstream cavity.

18. A nozzle for converting liquid flowing from an upstream cavity into solid particles which flow into a downstream cavity, comprising:
   (a) a body having an inlet surface and an outlet surface;
   (b) at least one primary orifice formed through said body, each of said primary orifices communicating with said inlet surface, and communicating with said outlet surface; and
   (c) precooling means connected to said body for cooling the liquid prior to the liquid flowing into said primary orifices, said precooling means comprising
      (i) a pilot nozzle connected to said body and extending upstream therefrom;
      (ii) a continuous central cavity formed in said pilot nozzle and through said body, said central cavity communicating with the downstream cavity; and
      (iii) a pilot orifices formed in said pilot nozzle, said pilot orifices communicating with the upstream cavity and with said central cavity.

19. A nozzle as claimed in claim 18 wherein said central cavity is adapted to prevent solid particles from blocking said central cavity.

20. A nozzle as claimed in claim 19 wherein said central cavity is tapered, such that it has a cross sectional area which increases in the downstream direction.

21. A nozzle as claimed in claim 18 further comprising:
   (a) an exit nozzle connected to said body and extending therefrom in the down direction, said exit nozzle terminating in an exit surface; and
   (b) said central cavity formed continuously through said exit nozzle and communicating with the downstream cavity at said exit surface.

22. A nozzle as claimed in claim 21 wherein said central cavity is tapered such that it has a cross sectional area which increases in the downstream direction.

23. A nozzle as claimed in claim 21 further comprising mixing means for causing the liquid to mix while flowing adjacent said pilot nozzle, thereby increasing the transfer of heat from the liquid to said pilot nozzle.

24. A nozzle as claimed in claim 23 wherein said mixing means comprises a spring disposed about said pilot nozzle, said spring being connected to said body.

25. A nozzle as claimed in claim 18 wherein said primary orifices have aspect ratios of at least 4.0.

26. A nozzle as claimed in claim 18 wherein said pilot orifice has an aspect ratio of at least 4.0.

27. A nozzle as claimed in claim 24 wherein:
 (a) said exit nozzle has an exterior surface which is continuous with said outlet surface of said body, said exterior surface terminating at said exit surface; and
 (b) at least a portion of said exterior surface being an inclined surface of increasing circumference in the downstream direction.

28. A nozzle as claimed in claim 27 further comprising:
 (a) a housing in which said nozzle is disposed, said housing having a lower portion extending downstream of said body; and
 (b) an exit cavity formed by said housing, said outlet surface of said body, and said exterior surface of said exit nozzle, said exit cavity terminating at said exit surface in an exit opening, a portion of said exit cavity adjacent said exit opening having a decreasing cross sectional area in the downstream direction.

29. A nozzle for converting liquid flowing from an upstream cavity into solid particles which flow into a downstream cavity, said nozzle comprising:
 (a) a body having an inlet surface and an outlet surface;
 (b) at least one primary orifice formed through said body, each of said primary orifices communicating with said inlet surface, and communicating with said outlet surface, each respective primary orifice being adapted to effect the phase change of the liquid flowing into said respective primary orifice from the liquid phase to the solid phase, said phase change cooling said body;
 (c) a housing in which said body is disposed, said housing having a lower portion which extends downstream of said body;
 (d) an exit nozzle connected to said body and extending therefrom in the downstream direction, said exit nozzle terminating in an exit surface, said exit nozzle having an exterior surface which is continuous with said outlet surface of said body, said exterior surface terminating at said exit surface, at least a portion of said exterior surface being an inclined surface of increasing circumference in the downstream direction; and
 (e) an exit cavity formed by said housing, said outlet surface of said body, and said exterior surface of said exit nozzle, said exit cavity terminating at said exit surface in an exit opening.

30. A nozzle for converting liquid flowing from an upstream cavity into solid particles which flow into a downstream cavity, comprising:
 (a) a body having an inlet surface and an outlet surface;
 (b) at least one primary orifice formed through said body, each of said primary orifices communicating with said inlet surface, and communicating with said outlet surface, each respective primary orifice being adapted to effect the phase change of the liquid flowing into said respective primary orifice from the liquid phase to the solid phase, said phase change cooling said body;
 (c) a pilot orifice formed through said body, said pilot orifice communicating with the upstream cavity;
 (d) an exit nozzle connected to said body and extending therefrom in the downstream direction, said exit nozzle terminating in an exit surface, said exit nozzle having an exterior surface which is continuous with said outlet surface of said body, said exterior surface terminating at said exit surface, at least a portion of said exterior surface being an inclined surface of increasing circumference in the downstream direction; and
 (e) a continuous central cavity formed in said exit nozzle, said central cavity communicating with said pilot orifice and the downstream cavity.

* * * * *

UNITED STATES PATENT AND TRADEMARK OFFICE
CERTIFICATE OF CORRECTION

PATENT NO. : 5,018,667

DATED : May 28, 1991

INVENTOR(S) : Daniel L. Lloyd

It is certified that error appears in the above-identified patent and that said Letters Patent is hereby corrected as shown below:

Claim 18 - Column 10 - Line 40 - "orifices" should be deleted and replaced with --orifice--.

Claim 18 - Column 10 - Line 41 - "orifices" should be deleted and replaced with --orifice--.

Claim 21 - Column 10 - Line 53 - "down" should be deleted and replaced with --downstream--.

Claim 27 - Column 11 - Line 5 - "Claim 24" should be deleted and replaced with --Claim 21--.

Signed and Sealed this

Third Day of November, 1992

*Attest:*

DOUGLAS B. COMER

*Attesting Officer*  *Acting Commissioner of Patents and Trademarks*